United States Patent
Wei et al.

(10) Patent No.: US 12,118,770 B2
(45) Date of Patent: Oct. 15, 2024

(54) IMAGE RECOGNITION METHOD AND APPARATUS, ELECTRONIC DEVICE AND READABLE STORAGE MEDIUM

(71) Applicant: BEIJING BAIDU NETCOM SCIENCE TECHNOLOGY CO., LTD., Beijing (CN)

(72) Inventors: Shengyu Wei, Beijing (CN); Yuning Du, Beijing (CN); Xueying Lyu, Beijing (CN); Ying Zhou, Beijing (CN); Qiao Zhao, Beijing (CN); Qiwen Liu, Beijing (CN); Ran Bi, Beijing (CN); Xiaoguang Hu, Beijing (CN); Dianhai Yu, Beijing (CN); Yanjun Ma, Beijing (CN)

(73) Assignee: BEIJING BAIDU NETCOM SCIENCE TECHNOLOGY CO., LTD., Beijin (CN)

( * ) Notice: Subject to any disclaimer, the term of this patent is extended or adjusted under 35 U.S.C. 154(b) by 441 days.

(21) Appl. No.: 17/657,118

(22) Filed: Mar. 29, 2022

(65) Prior Publication Data

US 2023/0096921 A1   Mar. 30, 2023

(30) Foreign Application Priority Data

Sep. 29, 2021   (CN) .......................... 202111152594.4

(51) Int. Cl.
*G06V 10/00* (2022.01)
*G06V 10/40* (2022.01)
(Continued)

(52) U.S. Cl.
CPC ............ *G06V 10/764* (2022.01); *G06V 10/40* (2022.01); *G06V 10/761* (2022.01)

(58) Field of Classification Search
CPC .... G06V 10/764; G06V 10/761; G06V 10/40; G06V 10/82; G06V 40/172; G06F 18/24; G06F 18/22; G06F 18/213
See application file for complete search history.

(56) References Cited

U.S. PATENT DOCUMENTS

| | | | |
|---|---|---|---|
| 7,895,201 B2* | 2/2011 | Nakamura | G06F 18/24147 707/736 |
| 8,842,891 B2* | 9/2014 | Nagesh | G06V 40/169 382/209 |

(Continued)

FOREIGN PATENT DOCUMENTS

| CN | 109684005 A | 4/2019 |
|---|---|---|
| CN | 110019907 A | 7/2019 |

(Continued)

OTHER PUBLICATIONS

Chinese Office Action Dated Feb. 21, 2022 for Chinese Application No. 202111152594.4, 9 Pages.

*Primary Examiner* — Amir Alavi
(74) *Attorney, Agent, or Firm* — Kwan & Olynick LLP

(57) ABSTRACT

The present disclosure provides an image recognition method and apparatus, an electronic device and a readable storage medium, and relates to the field of artificial intelligence technologies, such as image processing and deep learning technologies. The image recognition method includes: acquiring a to-be-recognized image, and determining a to-be-recognized subject in the to-be-recognized image; extracting a subject feature of the to-be-recognized subject, and obtaining a target feature according to the subject feature; determining a target candidate feature in a plurality of candidate features using the target feature; and taking a class corresponding to the target candidate feature as a recognition result of the to-be-recognized subject. With the present disclosure, different image recognition require- (Continued)

ments may be met, and a speed and accuracy of image recognition may be improved.

15 Claims, 3 Drawing Sheets

(51) Int. Cl.
*G06V 10/74* (2022.01)
*G06V 10/764* (2022.01)

(56) References Cited

U.S. PATENT DOCUMENTS

| | | | | |
|---|---|---|---|---|
| 10,089,548 | B2 * | 10/2018 | Ando | G06F 18/24 |
| 10,123,747 | B2 * | 11/2018 | Govindjee | A61B 3/12 |
| 10,445,694 | B2 * | 10/2019 | Fisher | G06T 7/20 |
| 10,474,992 | B2 * | 11/2019 | Fisher | G06Q 10/087 |
| 10,936,916 | B1 * | 3/2021 | Rahnama-Moghaddam | G06V 10/764 |
| 10,963,675 | B2 * | 3/2021 | Boic | G06V 40/172 |
| 11,232,575 | B2 * | 1/2022 | Fisher | G06T 7/292 |
| 11,295,128 | B2 * | 4/2022 | Inoue | G06V 10/141 |
| 2009/0297048 | A1 * | 12/2009 | Slotine | G06V 10/7715 382/224 |
| 2023/0096921 | A1 * | 3/2023 | Wei | G06V 10/40 382/103 |

FOREIGN PATENT DOCUMENTS

| | | |
|---|---|---|
| CN | 111079699 A | 4/2020 |
| CN | 111523605 A | 8/2020 |
| CN | 111626371 A | 9/2020 |
| CN | 111898747 A | 11/2020 |
| CN | 112801070 A | 5/2021 |
| CN | 112906728 A | 6/2021 |
| CN | 113033282 A | 6/2021 |

\* cited by examiner

IMAGE RECOGNITION METHOD AND APPARATUS, ELECTRONIC DEVICE AND READABLE STORAGE MEDIUM

The present application claims the priority of Chinese Patent Application No. 202111152594.4, filed on Sep. 29, 2021, with the title of "IMAGE RECOGNITION METHOD AND APPARATUS, ELECTRONIC DEVICE AND READABLE STORAGE MEDIUM". The disclosure of the above application is incorporated herein by reference in its entirety.

FIELD OF THE DISCLOSURE

The present disclosure relates to the field of computer technologies, and particularly to the field of artificial intelligence technologies, such as image processing and deep learning technologies, and provides an image recognition method and apparatus, an electronic device and a readable storage medium.

BACKGROUND OF THE DISCLOSURE

With a rapid development of a deep neural network, image recognition is usually performed using an established image recognition model in a prior art. However, the image recognition model in the prior art can only recognize images of a specific type, and cannot recognize images of other types, and if a new type is added, the image recognition model is required to be trained again, such that an existing image recognition method cannot meet different image recognition requirements.

SUMMARY OF THE DISCLOSURE

According to a first aspect of the present disclosure, there is provided an image recognition method, including: acquiring a to-be-recognized image, and determining a to-be-recognized subject in the to-be-recognized image; extracting a subject feature of the to-be-recognized subject, and obtaining a target feature according to the subject feature; determining a target candidate feature in a plurality of candidate features using the target feature; and taking a class corresponding to the target candidate feature as a recognition result of the to-be-recognized subject.

According to a second aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform an image recognition method, wherein the image recognition method includes: acquiring a to-be-recognized image and determining a to-be-recognized subject in the to-be-recognized image; extracting a subject feature of the to-be-recognized subject and obtaining a target feature according to the subject feature; determining a target candidate feature in a plurality of candidate features using the target feature; and taking a class corresponding to the target candidate feature as a recognition result of the to-be-recognized subject.

According to a third aspect of the present disclosure, there is provided a non-transitory computer readable storage medium with computer instructions stored thereon, wherein the computer instructions are used for causing a computer to perform an image recognition method, wherein the image recognition method includes: acquiring a to-be-recognized image, and determining a to-be-recognized subject in the to-be-recognized image; extracting a subject feature of the to-be-recognized subject, and obtaining a target feature according to the subject feature; determining a target candidate feature in a plurality of candidate features using the target feature; and taking a class corresponding to the target candidate feature as a recognition result of the to-be-recognized subject.

From the technical solution of the present disclosure, image recognition requirements in different scenarios, such as plural quantities and plural classes, can be met, and the target candidate feature in the plural candidate features is determined by the obtained target feature corresponding to the subject feature, thus improving a speed and accuracy of image recognition.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Figure 1:
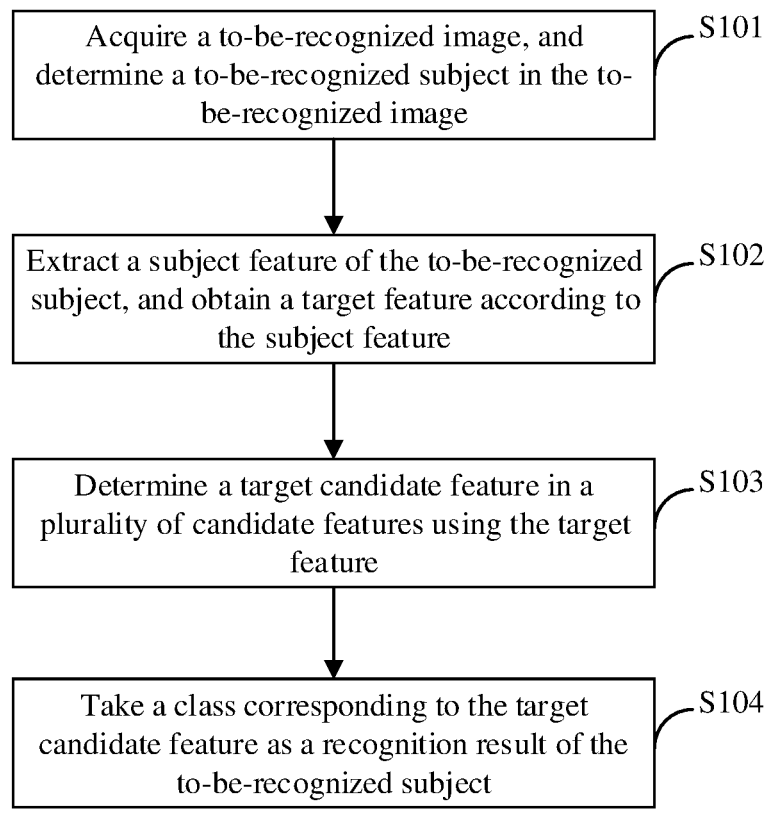
FIG. 1 is a schematic diagram according to a first embodiment of the present disclosure.

FIG. 1 is a schematic diagram according to a first embodiment of the present disclosure. As shown in FIG. 1, an image recognition method according to the present embodiment includes the following steps:

S101: acquiring a to-be-recognized image, and determining a to-be-recognized subject in the to-be-recognized image;

S102: extracting a subject feature of the to-be-recognized subject, and obtaining a target feature according to the subject feature;

S103: determining a target candidate feature in a plurality of candidate features using the target feature; and S104: taking a class corresponding to the target candidate feature as a recognition result of the to-be-recognized subject.

In the image recognition method according to the present embodiment, after determination of the to-be-recognized subject in the acquired to-be-recognized image, firstly, the subject feature of the determined to-be-recognized subject is extracted, and the target feature is obtained according to the subject feature; secondly, the target candidate feature in the plural candidate features is determined using the obtained target feature; and finally, the class corresponding to the determined target candidate feature is taken as the recognition result of the to-be-recognized subject. According to the present embodiment, image recognition requirements in different scenarios, such as plural quantities and plural classes, can be met, and the target candidate feature in the plural candidate features is determined by the obtained target feature corresponding to the subject feature, thus improving a speed and accuracy of image recognition.

In the present embodiment, during execution of S101 of acquiring a to-be-recognized image, an image captured by an input terminal in real time may be used as the to-be-recognized image, a captured image input by the input terminal may be used as the to-be-recognized image, and an image selected from the Internet may be used as the to-be-recognized image.

In the present embodiment, after the execution of S101 of acquiring a to-be-recognized image, the to-be-recognized subject in the to-be-recognized image is determined, and one or more to-be-recognized subjects may be determined by executing S101 in the present embodiment.

In the present embodiment, during execution of S101 of determining a to-be-recognized subject in the to-be-recognized image, subject detection may be performed on the to-be-recognized image, all subject detection results obtained by the detection may be used as the to-be-recognized subjects, and a known target detection model may be used to realize the subject detection of the to-be-recognized image in the present embodiment.

In order to improve accuracy of the determined to-be-recognized subject, in the present embodiment, during the execution of S101 of determining a to-be-recognized subject in the to-be-recognized image, an adopted optional implementation may include: performing subject detection on the to-be-recognized image to obtain at least one subject detection result in the to-be-recognized image; and taking a subject detection result in the obtained at least one subject detection result meeting a preset requirement as the to-be-recognized subject; that is, a purpose of recognizing a specific subject in the to-be-recognized image may be achieved in the present embodiment.

In the present embodiment, during execution of S101 of taking a subject detection result in the at least one subject detection result meeting a preset requirement as the to-be-recognized subject, a subject detection result with a subject size exceeding a preset size threshold may be taken as the to-be-recognized subject.

In the present embodiment, after the execution of S101 of determining a to-be-recognized subject in the to-be-recognized image, S102 of extracting a subject feature of the determined to-be-recognized subject is executed, and the target feature is obtained according to the extracted subject feature.

It may be understood that, in the present embodiment, if a plurality of to-be-recognized subjects are determined by executing S101, during execution of S102, the subject feature of each to-be-recognized subject is extracted, and the target feature is obtained according to each extracted subject feature.

Specifically, in the present embodiment, during the execution of S102 of extracting a subject feature of the to-be-recognized subject, an adopted optional implementation may include: inputting the to-be-recognized subject into an image recognition model, the image recognition model being a known neural network model capable of recognizing a subject of a preset class; and acquiring input content of a last layer in the image recognition model as the subject feature of the to-be-recognized subject.

That is, in the present embodiment, the known image recognition model is used to extract the subject feature of the to-be-recognized subject, thus reducing difficulty during extraction of the subject feature; and the input content of the last layer (typically, a fully connected layer for classification) in the image recognition model is used as the subject feature, thus improving accuracy of the extracted subject feature.

In addition, in the present embodiment, during the execution of S102 of extracting a subject feature of the to-be-recognized subject, basic statistical features, such as a pixel number, a histogram feature, and a gray level co-occurrence matrix, may further be extracted from the to-be-recognized subject, and the extracted basic statistical feature is taken as the subject feature of the to-be-recognized subject.

Since the extracted subject feature is usually a multi-dimensional feature, and a retrieval speed is low when the multi-dimensional feature is used for retrieval, in the present embodiment, after the execution of S102 of extracting a subject feature of the to-be-recognized subject, the target feature may further be obtained according to the extracted subject feature.

Specifically, in the present embodiment, during execution of S102 of obtaining a target feature according to the extracted subject feature, an adopted optional implementation may include: acquiring a preset processing method; and processing the subject feature using the acquired preset processing method, and taking a processing result as the target feature.

In the present embodiment, the preset processing method acquired during execution of S102 may be a feature dimension reduction method, such as a hash function and a deep hash model; in the present embodiment, during execution of S102 of processing the subject feature using the hash function or the deep hash model, the obtained target feature is specifically a binary code.

That is, in the present embodiment, the subject feature is processed by means of a dimension reduction processing operation to obtain the target feature, and then, the target feature after dimension reduction is used for retrieval in a retrieval library. Since a dimension of the target feature is reduced, the retrieval speed can be increased, thereby correspondingly increasing an image recognition speed.

In the present embodiment, after the execution of S102 of obtaining a target feature according to the subject feature, S103 of determining a target candidate feature in a plurality of candidate features using the obtained target feature is executed.

It may be understood that, in the present embodiment, if a plurality of subject features are obtained by executing S102, the target candidate feature is determined for each subject feature during execution of S103.

In the present embodiment, the plural candidate features used when S103 is executed may be pre-generated, each candidate feature corresponds to one class, and a plurality of candidate features may correspond to a same class.

In the present embodiment, when the plural candidate features are pre-generated, an adopted method may include: acquiring standard images corresponding to different classes, the standard image in the present embodiment being an image only containing one subject, and each class corresponding to one or more standard images; and obtaining the candidate feature according to each standard image, and establishing an index between the obtained candidate feature and the class corresponding to the standard image.

The candidate feature in the present embodiment may be the subject feature extracted from the image, or the target feature obtained according to the subject feature.

In addition, in the present embodiment, after the plural candidate features are pre-generated, the retrieval library is established according to each candidate feature and a class corresponding to the candidate feature, and then, the obtained target feature is used for retrieval in the established retrieval library, thereby determining the target candidate feature.

If a new class exists, in the present embodiment, a standard image corresponding to the new class may be acquired, a candidate feature is obtained according to the acquired standard image, and an index between the candidate feature and the new class is further established, thereby avoiding a problem that the image recognition model is required to be retrained when a new class exists in an existing image recognition method.

Specifically, in the present embodiment, during execution of S103 of determining a target candidate feature in a plurality of candidate features using the obtained target feature, an adopted optional implementation may include: acquiring a recognition type of the to-be-recognized subject, the recognition type in the present embodiment being face recognition, commodity recognition, vehicle recognition, or the like; determining a similarity calculation method corresponding to the acquired recognition type, the similarity calculation method in the present embodiment being Metric Learning impairment functions of different types; calculating similarity between the target feature and the plurality of candidate features using the determined similarity calculation method; and taking a candidate feature with the highest similarity calculation result as the target candidate feature.

That is, in the present embodiment, different similarity calculation methods are set, and the calculation of the similarity between the target feature and the candidate feature is completed using the similarity calculation method corresponding to the acquired recognition type, such that the obtained similarity calculation result is more accurate, thereby improving accuracy of the determined target candidate feature.

In the present embodiment, after the execution of S103 of determining a target candidate feature in the plurality of candidate features, S104 of taking a class corresponding to the determined target candidate feature as the recognition result of the to-be-recognized subject is executed.

In the present embodiment, during the execution of S104, according to the index between the candidate feature and the class corresponding to the candidate feature, the class corresponding to the determined target candidate feature may be acquired from the index as the recognition result of the to-be-recognized subject.

Figure 2:
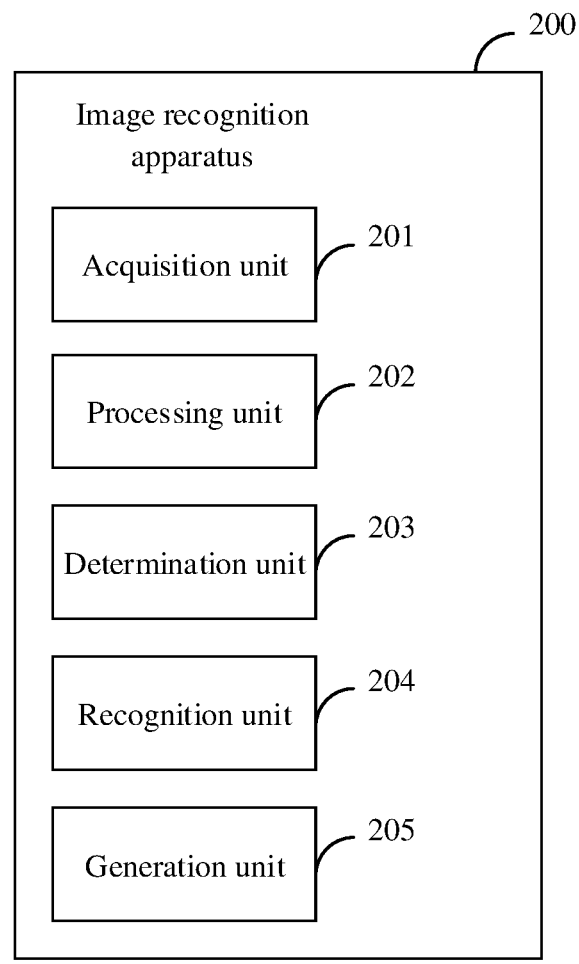
FIG. 2 is a schematic diagram according to a second embodiment of the present disclosure.

FIG. 2 is a schematic diagram according to a second embodiment of the present disclosure. As shown in FIG. 2, an image recognition apparatus 200 according to the present embodiment includes:
  an acquisition unit 201 configured to acquire a to-be-recognized image and determine a to-be-recognized subject in the to-be-recognized image;
  a processing unit 202 configured to extract a subject feature of the to-be-recognized subject and obtain a target feature according to the subject feature;
  a determination unit 203 configured to determine a target candidate feature in a plurality of candidate features using the target feature; and
  a recognition unit 204 configured to take a class corresponding to the target candidate feature as a recognition result of the to-be-recognized subject.

When acquiring the to-be-recognized image, the acquisition unit 201 may take an image captured by an input terminal in real time, or a captured image input by the input terminal, or an image selected from the Internet, as the to-be-recognized image.

The acquisition unit 201 determines the to-be-recognized subject in the to-be-recognized image after acquiring the to-be-recognized image, and one or more to-be-recognized subjects are determined by the acquisition unit 201.

When determining the to-be-recognized subject in the to-be-recognized image, the acquisition unit 201 may perform subject detection on the to-be-recognized image, and use all subject detection results obtained by the detection as the to-be-recognized subjects, and the acquisition unit 201 may use a known target detection model to realize the subject detection of the to-be-recognized image.

In order to improve accuracy of the determined to-be-recognized subject, when determining the to-be-recognized subject in the to-be-recognized image, in an optional implementation, the acquisition unit 201 may: perform subject detection on the to-be-recognized image to obtain at least one subject detection result in the to-be-recognized image; and take a subject detection result in the obtained at least one subject detection result meeting a preset requirement as the to-be-recognized subject; that is, a purpose of recognizing a specific subject in the to-be-recognized image may be achieved in the present embodiment.

When taking the subject detection result in the at least one subject detection result meeting the preset requirement as the to-be-recognized subject, the acquisition unit 201 may take a subject detection result with a subject size exceeding a preset size threshold as the to-be-recognized subject.

In the present embodiment, after the acquisition unit 201 determines the to-be-recognized subject in the to-be-recognized image, the processing unit 202 extracts the subject feature of the determined to-be-recognized subject and obtains the target feature according to the extracted subject feature.

It may be understood that, if the acquisition unit 201 determines a plurality of to-be-recognized subjects, the processing unit 202 extracts the subject feature of each to-be-recognized subject, and obtains the target feature according to each extracted subject feature.

Specifically, when extracting the subject feature of the to-be-recognized subject, in an optional implementation, the processing unit 202 may: input the to-be-recognized subject into an image recognition model; and acquire input content of a last layer in the image recognition model as the subject feature of the to-be-recognized subject.

That is, the processing unit 202 uses the known image recognition model to extract the subject feature of the to-be-recognized subject, thus reducing difficulty during extraction of the subject feature; and uses the input content of the last layer (typically, a fully connected layer for classification) in the image recognition model as the subject feature, thus improving accuracy of the extracted subject feature.

In addition, when extracting the subject feature of the to-be-recognized subject, the processing unit 202 may also extract basic statistical features, such as a pixel number, a histogram feature, and a gray level co-occurrence matrix, from the to-be-recognized subject, and take the extracted basic statistical feature as the subject feature of the to-be-recognized subject.

Since the extracted subject feature is usually a multi-dimensional feature, and a retrieval speed is low when the multi-dimensional feature is used for retrieval, after extracting the subject feature of the to-be-recognized subject, the processing unit 202 may further obtain the target feature according to the extracted subject feature.

Specifically, when obtaining the target feature according to the extracted subject feature, in an optional implementation, the processing unit 202 may: acquire a preset processing method; and process the subject feature using the acquired preset processing method, and take a processing result as the target feature.

The preset processing method acquired by the processing unit 202 may be a feature dimension reduction method, such as a hash function and a deep hash model; when the processing unit 202 uses the hash function or the deep hash model to process the subject feature, the obtained target feature is specifically a binary code.

That is, the processing unit 202 obtains the target feature by means of a dimension reduction processing operation, and then uses the target feature after dimension reduction for retrieval in a retrieval library. Since a dimension of the target feature is reduced, the retrieval speed can be increased, thereby correspondingly increasing an image recognition speed.

In the present embodiment, after the processing unit 202 obtains the target feature according to the subject feature, the determination unit 203 uses the obtained target feature to determine the target candidate feature in the plurality of candidate features.

It may be understood that, if the processing unit 202 obtains a plurality of subject features, the determination unit 203 determines the target candidate feature for each subject feature.

The plural candidate features used by the determination unit 203 may be pre-generated, each candidate feature corresponds to one class, and a plurality of candidate features may correspond to a same class.

The image recognition apparatus 200 according to the present embodiment may further include a generation unit 205 configured to pre-generate the plurality of candidate features by: acquiring standard images corresponding to different classes; and obtaining the candidate feature according to each standard image, and establishing an index between the obtained candidate feature and the class corresponding to the standard image.

The candidate feature obtained by the generation unit 205 may be the subject feature extracted from the image, or the target feature obtained according to the subject feature.

In addition, after pre-generating the plural candidate features, the generation unit 205 establishes the retrieval library according to each candidate feature and a class corresponding to the candidate feature, and then uses the obtained target feature for retrieval in the established retrieval library, thereby determining the target candidate feature.

If a new class exists, the generation unit 205 may acquire a standard image corresponding to the new class, obtain the candidate feature according to the acquired standard image, and then establish an index between the candidate feature and the new class, thereby avoiding a problem that the image recognition model is required to be retrained when a new class exists in an existing image recognition method.

Specifically, when determining the target candidate feature in the plural candidate features using the obtained target feature, in an optional implementation, the determination unit 203 may: acquire a recognition type of the to-be-recognized subject; determine a similarity calculation method corresponding to the acquired recognition type; calculate similarity between the target feature and the plurality of candidate features using the determined similarity calculation method; and take a candidate feature with the highest similarity calculation result as the target candidate feature.

That is, the determination unit 203 may set different similarity calculation methods, and thus complete the calculation of the similarity between the target feature and the candidate feature using the similarity calculation method corresponding to the acquired recognition type, such that the obtained similarity calculation result is more accurate, thereby improving accuracy of the determined target candidate feature.

In the present embodiment, after the determination unit 203 determines the target candidate feature in the plurality of candidate features, the recognition unit 204 takes a class corresponding to the determined target candidate feature as the recognition result of the to-be-recognized subject.

According to the index between the candidate feature and the class corresponding to the candidate feature, the recognition unit 204 may acquire the class corresponding to the determined target candidate feature from the index as the recognition result of the to-be-recognized subject.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 3:
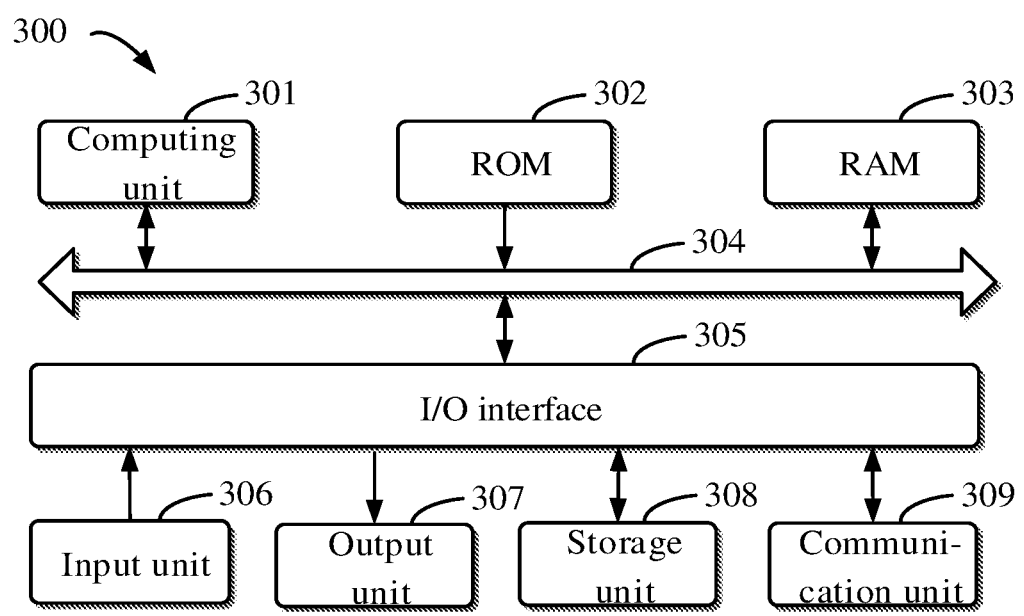
FIG. 3 is a block diagram of an electronic device configured to implement an image recognition method according to the embodiment of the present disclosure.

FIG. 3 is a block diagram of an electronic device configured to implement an image recognition method according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 3, the device 300 includes a computing unit 301 which may perform various appropriate actions and processing operations according to a computer program stored in a read only memory (ROM) 302 or a computer program loaded from a storage unit 308 into a random access memory (RAM) 303. Various programs and data necessary for the operation of the device 300 may be also stored in the RAM 303. The computing unit 301, the ROM 302, and the RAM 303 are connected with one other through a bus 304. An input/output (I/O) interface 305 is also connected to the bus 304.

The plural components in the device 300 are connected to the I/O interface 305, and include: an input unit 306, such as a keyboard, a mouse, or the like; an output unit 307, such as various types of displays, speakers, or the like; the storage unit 308, such as a magnetic disk, an optical disk, or the like; and a communication unit 309, such as a network card, a modem, a wireless communication transceiver, or the like. The communication unit 309 allows the device 300 to exchange information/data with other devices through a computer network, such as the Internet, and/or various telecommunication networks.

The computing unit 301 may be a variety of general and/or special purpose processing components with processing and computing capabilities. Some examples of the computing unit 301 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 301 performs the methods and processing operations described above, such as the image recognition method. For example, in some embodiments, the image recognition method may be implemented as a computer software program tangibly contained in a machine readable medium, such as the storage unit 308.

In some embodiments, part or all of the computer program may be loaded and/or installed into the device 300 via the ROM 302 and/or the communication unit 309. When the computer program is loaded into the RAM 303 and executed by the computing unit 301, one or more steps of the image recognition method described above may be performed. Alternatively, in other embodiments, the computing unit 301 may be configured to perform the image recognition method by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable image recognition apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. An image recognition method, comprising:
   acquiring a to-be-recognized image, and determining a to-be-recognized subject in the to-be-recognized image;
   extracting a subject feature of the to-be-recognized subject, and obtaining a target feature according to the subject feature;
   determining a target candidate feature in a plurality of candidate features using the target feature; and
   acquiring a class corresponding to the target candidate feature as a recognition result of the to-be-recognized subject,
   wherein the extracting a subject feature of the to-be-recognized subject comprises:
   inputting the to-be-recognized subject into an image recognition model; and
   acquiring input content of a last layer in the image recognition model as the subject feature of the to-be-recognized subject.

2. The method according to claim 1, wherein the determining a to-be-recognized subject in the to-be-recognized image comprises:
   performing subject detection on the to-be-recognized image to obtain at least one subject detection result in the to-be-recognized image; and
   acquiring a subject detection result in the at least one subject detection result meeting a preset requirement as the to-be-recognized subject, wherein the preset requirement is a subject size exceeding a preset size threshold.

3. The method according to claim 1, wherein the obtaining a target feature according to the subject feature comprises:
   acquiring a preset processing method, wherein the preset processing method is a feature dimension reduction method comprising a hash function or a deep hash model; and
   processing the subject feature using the preset processing method, and taking a processing result as the target feature.

4. The method according to claim 1, further comprising: pre-generating a plurality of candidate features by:
   acquiring standard images corresponding to different classes; and
   obtaining the candidate feature according to each standard image, and establishing an index between the candidate feature and the class corresponding to the standard image.

5. The method according to claim 1, wherein the determining a target candidate feature in a plurality of candidate features using the target feature comprises:
   acquiring a recognition type of the to-be-recognized subject;
   determining a similarity calculation method corresponding to the recognition type;
   calculating similarity between the target feature and the plurality of candidate features using the similarity calculation method; and
   taking a candidate feature with the highest similarity calculation result as the target candidate feature.

6. An electronic device, comprising:
   at least one processor; and
   a memory communicatively connected with the at least one processor;
   wherein the memory stores instructions executable by the at least one processor, and the instructions are executed by the at least one processor to enable the at least one processor to perform an image recognition method, wherein the image recognition method comprises:
   acquiring a to-be-recognized image and determining a to-be-recognized subject in the to-be-recognized image;
   extracting a subject feature of the to-be-recognized subject and obtaining a target feature according to the subject feature;
   determining a target candidate feature in a plurality of candidate features using the target feature; and
   acquiring a class corresponding to the target candidate feature as a recognition result of the to-be-recognized subject,
   wherein the extracting a subject feature of the to-be-recognized subject comprises:
   inputting the to-be-recognized subject into an image recognition model; and
   acquiring input content of a last layer in the image recognition model as the subject feature of the to-be-recognized subject.

7. The electronic device according to claim 6, wherein the determining a to-be-recognized subject in the to-be-recognized image comprises:
   performing subject detection on the to-be-recognized image to obtain at least one subject detection result in the to-be-recognized image; and
   acquiring a subject detection result in the at least one subject detection result meeting a preset requirement as the to-be-recognized subject, wherein the preset requirement is a subject size exceeding a preset size threshold.

8. The electronic device according to claim 6, wherein the obtaining a target feature according to the subject feature comprises:
   acquiring a preset processing method; and
   processing the subject feature using the preset processing method, and taking a processing result as the target feature, wherein the preset processing method is a feature dimension reduction method comprising a hash function or a deep hash model.

9. The electronic device according to claim 6, further comprising: pre-generating a plurality of candidate features by:
   acquiring standard images corresponding to different classes; and
   obtaining the candidate feature according to each standard image, and establishing an index between the candidate feature and the class corresponding to the standard image.

10. The electronic device according to claim 6, wherein the determining a target candidate feature in a plurality of candidate features using the target feature comprises:
    acquiring a recognition type of the to-be-recognized subject;
    determining a similarity calculation method corresponding to the recognition type;
    calculating similarity between the target feature and the plurality of candidate features using the similarity calculation method; and
    taking a candidate feature with the highest similarity calculation result as the target candidate feature.

11. A non-transitory computer readable storage medium with computer instructions stored thereon, wherein the computer instructions are used for causing a computer to perform an image recognition method, wherein the image recognition method comprises:
    acquiring a to-be-recognized image, and determining a to-be-recognized subject in the to-be-recognized image;
    extracting a subject feature of the to-be-recognized subject, and obtaining a target feature according to the subject feature;
    determining a target candidate feature in a plurality of candidate features using the target feature; and
    acquiring a class corresponding to the target candidate feature as a recognition result of the to-be-recognized subject,
    wherein the extracting a subject feature of the to-be-recognized subject comprises:
    inputting the to-be-recognized subject into an image recognition model; and
    acquiring input content of a last layer in the image recognition model as the subject feature of the to-be-recognized subject.

12. The non-transitory computer readable storage medium according to claim 11, wherein the determining a to-be-recognized subject in the to-be-recognized image comprises:
    performing subject detection on the to-be-recognized image to obtain at least one subject detection result in the to-be-recognized image; and
    acquiring a subject detection result in the at least one subject detection result meeting a preset requirement as the to-be-recognized subject, wherein the preset requirement is a subject size exceeding a preset size threshold.

13. The non-transitory computer readable storage medium according to claim 11, wherein the obtaining a target feature according to the subject feature comprises:
    acquiring a preset processing method, wherein the preset processing method is a feature dimension reduction method comprising a hash function or a deep hash model; and
    processing the subject feature using the preset processing method, and taking a processing result as the target feature.

14. The non-transitory computer readable storage medium according to claim 11, further comprising: pre-generating a plurality of candidate features by:
    acquiring standard images corresponding to different classes; and
    obtaining the candidate feature according to each standard image, and establishing an index between the candidate feature and the class corresponding to the standard image.

15. The non-transitory computer readable storage medium according to claim 11, wherein the determining a target candidate feature in a plurality of candidate features using the target feature comprises:
    acquiring a recognition type of the to-be-recognized subject;
    determining a similarity calculation method corresponding to the recognition type;
    calculating similarity between the target feature and the plurality of candidate features using the similarity calculation method; and
    taking a candidate feature with the highest similarity calculation result as the target candidate feature.

* * * * *